United States Patent
Jacobs et al.

(10) Patent No.: US 6,226,511 B1
(45) Date of Patent: May 1, 2001

(54) METHOD AND APPARATUS FOR CONFIGURATION OF AUTHENTICATION CENTER OPERATIONS IN A MOBILE TELEPHONE SYSTEM

(75) Inventors: Pamela J. Jacobs, Omaha; James A. Lamb, Elk Horn, both of NE (US)

(73) Assignee: Campaq Computer Corporation, Houston, TX (US)

( * ) Notice: Subject to any disclaimer, the term of this patent is extended or adjusted under 35 U.S.C. 154(b) by 0 days.

(21) Appl. No.: 09/543,836

(22) Filed: Apr. 6, 2000

Related U.S. Application Data

(63) Continuation of application No. 08/781,258, filed on Jan. 11, 1997.

(51) Int. Cl.[7] .................................................. H04Q 7/20
(52) U.S. Cl. ......................... 455/411; 455/432; 455/433
(58) Field of Search .................................... 455/410, 411, 455/422, 432, 433, 435; 380/247, 248, 271

(56) References Cited

U.S. PATENT DOCUMENTS

| | | | |
|---|---|---|---|
| 4,799,061 | 1/1989 | Abraham et al. | 340/825.34 |
| 4,930,150 | 5/1990 | Katz | 379/93 |
| 5,014,298 | 5/1991 | Katz | 379/93 |
| 5,048,075 | 9/1991 | Katz | 379/92 |
| 5,077,790 | 12/1991 | D'Amico et al. | 455/435 |
| 5,091,942 | 2/1992 | Dent | 455/411 |
| 5,128,984 | 7/1992 | Katz | 379/92 |
| 5,204,902 | 4/1993 | Reeds, III et al. | 380/23 |
| 5,237,612 | 8/1993 | Raith | 455/411 |
| 5,282,250 | 1/1994 | Dent et al. | 455/411 |
| 5,309,501 | 5/1994 | Kozik et al. | 455/433 |
| 5,406,619 | 4/1995 | Akhteruzzaman et al. | 379/95 |
| 5,455,863 | 10/1995 | Brown et al. | 380/23 |
| 5,497,412 | 3/1996 | Lannen et al. | 379/60 |
| 5,504,804 | 4/1996 | Widmark et al. | 380/63 |
| 5,513,245 | 4/1996 | Mazikovsky et al. | 455/411 |
| 5,533,107 | 7/1996 | Irwin et al. | 379/201 |
| 5,537,474 | 7/1996 | Brown et al. | 380/23 |
| 5,551,073 | 8/1996 | Sammarco | 455/411 |
| 5,553,120 | 9/1996 | Katz | 379/88 |
| 5,590,175 | 12/1996 | Gallant et al. | 379/58 |
| 5,594,740 | 1/1997 | LaDue | 455/410 |
| 5,603,081 | 2/1997 | Raith et al. | 455/433 |
| 5,615,267 | 3/1997 | Lin et al. | 455/411 |
| 5,633,914 | 5/1997 | Rosa | 379/59 |
| 5,642,401 | 6/1997 | Yahagi | 455/411 |
| 5,668,875 | 9/1997 | Brown et al. | 455/411 |
| 5,708,710 | 1/1998 | Duda | 380/21 |
| 5,737,701 | 4/1998 | Rosenthal et al. | 455/411 |

(List continued on next page.)

FOREIGN PATENT DOCUMENTS

0690648 A2   1/1996   (EP) .

OTHER PUBLICATIONS

Mohan S. "Network Impacts of Privacy and Authentication Protocols for PCS," Communications—Gateway to Globalization, Proceedings of the Conference on Communications, Seattle, Jun. 18–22, 1995, IIEE 3:1557–1561.

*Primary Examiner*—Nay Maung
(74) *Attorney, Agent, or Firm*—Fenwick & West LLP

(57) ABSTRACT

A method and apparatus for allowing an Authentication Center (AC) in a cellular telephone system to order SSD update and unique challenge operations only if the receiving MSC/VLR is receptive to performing them. The AC has access to an MPCM file that indicates the circumstances under which each MSC/VLR in the system will perform SSD updates and unique challenges. Thus, whenever the AC determines that it is desirable to send either an SSD update or a unique challenge, the AC first checks the MPCM file to determine whether the message should be sent. If the database indicates that the MSC/VLR will not attempt the operation, the AC does not request the operation.

6 Claims, 20 Drawing Sheets

U.S. PATENT DOCUMENTS

| | | | |
|---|---|---|---|
| 5,754,952 | 5/1998 | Hodges et al. | 455/411 |
| 5,754,955 | 5/1998 | Ekbatani | 455/422 |
| 5,761,500 | 6/1998 | Gallant et al. | 707/10 |
| 5,794,139 | 8/1998 | Mazikovsky et al. | 455/403 |
| 5,822,691 | 10/1998 | Hosseini | 455/410 |
| 5,875,394 | 2/1999 | Daly et al. | 455/411 |
| 5,878,126 | 3/1999 | Velamuri et al. | 379/219 |
| 5,887,251 | 3/1999 | Fehnel | 455/411 |
| 5,937,068 | 8/1999 | Audebert | 380/23 |
| 5,943,425 | 8/1999 | Mizikovsky | 380/25 |
| 6,026,298 * | 2/2000 | Lamb et al. | 455/433 |
| 6,081,705 * | 6/2000 | Houde et al. | 455/411 |
| 6,085,083 * | 7/2000 | Lamb | 455/410 |
| 6,122,509 * | 9/2000 | Nguyen | 455/433 |
| 6,122,510 * | 9/2000 | Granberg | 455/433 |

* cited by examiner

| 702 | Authentication Request INVOKE Message | | |
|---|---|---|---|
| | Parameter | R/C | Description & Usage |
| | Mobile Identification Number (MIN) | R | Contains the MIN of the subscriber. Used as a key to the AC Subscriber Profile file (SUBA). |
| | Equipment Serial Number (ESN) | R | Contains the Equipment Serial Number of the subscriber. Used for validation by comparison with ESN in the SUBA file. |
| 704 | System Capabilities (SYSCAP Serving) | R | Defines the authentication capabilities of the serving system. |
| | System Access Type (SYSACCTYPE) | R | Identifies the type of system access made by the MS. |
| | MSCID (Serving MSC or VLR) | R | Contains the MSCID of the serving MSC/VLR. |
| 706 | Authentication Data | C | Contains the 24-bit authentication data used as input to CAVE for call origination. This parameter is derived from the information sent by the MS to the MSC/VLR. |
| | Authentication Response (AUTHR) | C | Contains the response generated by an MS when accessing the system for call origination, page response, or autonomous registration. It is computed by CAVE using the SSD of the MS and a Random Number (RAND) chosen by the MS. |
| | Call History Count (COUNT) | C | Contains a modulo-64 event counter maintained by the MS, the AC, and, optionally, the VLR. It is used for clone detection. The events that result in the counter being incremented are defined by the AC and, optionally, the VLR. They may include initial registration in a new serving MSC, call origination, page response, or expiration of a timer. |
| | Confidentiality Modes (Actual) | C | Not used by this release of AC. |
| 708 | Digits (Dialed) | C | Contains dialed digits for input to the CAVE algorithm if SYSACCTYPE is Call Origination. |
| | PC_SSN (Serving MSC or VLR) | C | Contains the Point Code and SSN of the serving MSC/VLR. |
| | Random Variable (RAND) | C | Contains a random number that is used as input to the CAVE algorithm for authentication. The random number is chosen by the serving system (MSC or VLR) independently of the AC. |
| | Sender Identification Number | C | Not used by this release of AC. |
| | Terminal Type | C | Identifies the radio frequency interface standard supported by the associated MS. |

FIG. 7(a)

| SYSACCTYPE | PARAMETERS |
|---|---|
| Unspecified or Reserved | MIN, ESN, SYSCAP, SYSACCTYPE, MSCID |
| Flash Request | MIN, ESN, SYSCAP, SYSACCTYPE, MSCID |
| Registration | MIN, ESN, SYSCAP, SYSACCTYPE, MSCID, RAND, and AUTHR |
| Call Origination | MIN, ESN, SYSCAP, SYSACCTYPE, MSCID, RAND, AUTHR, and (Dialed Digits or Authentication Data) |
| Page Response | MIN, ESN, SYSCAP, SYSACCTYPE, MSCID, RAND, and AUTHR |
| Not Used or No Access | MIN, ESN, SYSCAP, SYSACCTYPE, MSCID |

FIG. 7(b)

| Authentication Request RETURN RESULT Message | | |
|---|---|---|
| Parameter | R/C | Description & Usage |
| Authentication Algorithm Version | C | Not used by the current release of AC. |
| Authentication Response Unique challenge (AUTHU) | C | Contains the response to a Unique Challenge Order. It is computed by CAVE using the SSD of the MS and a Random Number (RANDU). |
| Call History Count (COUNT) | C | Not used by this release of AC. |
| CDMA Private Long Code Mask | C | Not used by the current release of AC. |
| Deny Access (DENACC) | C | Indicates a Deny Access response and the reason the MS has failed authentication. |
| Random Variable SSD (RANDSSD) | C | Contains a 56-bit random number that is used as input to the CAVE algorithm for generating Shared Secret Data (SSD). The random number is chosen by the AC when an SSD update is to be initiated. |
| Random Variable Unique Challenge (RANDU) | C | Contains a 32-bit random number that is used as input to the CAVE algorithm for authenticating a specific Mobile Station (MS). The random number is chosen by the AC when a unique challenge is to be initiated. |
| Shared Secret Data (SSD) | C | Contains the SSD used in authentication of a MS. The SSD is computed only at the AC and at the MS since it is based on the A-Key which is shared only between the AC and the MS. |
| Signaling Message Encryption Key | C | Not used by this release of AC. |
| Terminal Type (TERMTYP) | C | Identifies the radio frequency interface standard supported by the MS. The values of this parameter are derived from the IS-54 Mobile Protocol Capability Indicator (MPCI). |
| SSD Not Shared (NOSSD) | C | Indicates the previously provided SSD is no longer valid. |
| Update Count (UPDCOUNT) | C | Indicates the Call History Count in the MS, and optionally the MSC/VLR, should be incremented. |
| Voice Privacy Mask | C | Not used by this release of AC. |

FIG. 8(a)

| Authentication Event | MSC/VLR shares SSD | MSC/VLR does not share SSD |
|---|---|---|
| SSD Update | RANDSSD, and SSD | AUTHU, RANDSSD, RANDU, and NOSSD |
| Unique Challenge | RANDU, AUTHU, and SSD | RANDU, AUTHU, and NOSSD |

FIG. 8(b)

| Parameter | R/C | Description & Usage |
|---|---|---|
| Mobile Identification Number (MIN) | R | Contains the MIN of the subscriber. Used as a key to the AC Subscriber Profile file (SUBA). |
| Equipment Serial Number (ESN) | R | Contains Equipment Serial Number of the subscriber. Used for validation by comparison with ESN in the SUBA file. |
| Authentication Algorithm Version | C | Not used by the current release of AC. |
| Authentication Response Unique Challenge (AUTHU) | C | Contains the 18-bit response to a Unique Challenge Order. It is computed from the CAVE algorithm using the SSD of the MS and RANDU. |
| Call History Count (COUNT) | C | Not used by the current release of AC. |
| Deny Access (DENACC) | C | Not used by the current release of AC. |
| Location Area ID | C | Not used by is release of AC. |
| Random Variable SSD (RANDSSD) | C | Contains a 56-bit random number that is used as input to the CAVE algorithm for generating Shared Secret Data (SSD). The random number is chosen by the AC when an SSD update is to be initiated. |
| Random Variable Unique Challenge (RANDU) | C | Contains a 32-bit random number that is used as input to the CAVE algorithm for authenticating a specific Mobile Station (MS). The random number is chosen by the AC when a unique challenge is to be initiated. |
| Sender Identification Number | C | Not used by the current AC release. |
| Shared Secret Data (SSD) | C | The SSD is not included in the invoke since the Authentication Directive is routed to the HLR and the HLR is responsible for routing the Authentication Directive based on the most recent MS location data. Because the AC does not have the location data stored in the HLR, it cannot determine if SSD is shared. Therefore, to avoid sending SSD to a MSC/VLR that is not supposed to share SSD, SSD is not included in the Authentication Directive |
| SSD Not Shared (NOSSD) | C | Indicates the previously provided SSD is no longer valid. |
| Update Count (UPDCOUNT) | C | Not used by the current release of AC. |

FIG. 9(a)

| Authentication Event | Invoke Message Contents |
|---|---|
| Immediate Manual SSD Update | MIN, ESN, RANDSSD, RANDU, AUTHU, and NOSSD |
| Manual Unique Challenge | MIN, ESN, RANDU, and AUTHU |
| Subscriber MS ESN Change | MIN, ESN, and NOSSD |
| Subscriber Authentication Deactivation | MIN, ESN, and NOSSD |

FIG. 9(b)

| Authentication Directive RETURN RESULT Message ||| 
|---|---|---|
| Parameter | R/C | Description & Usage |
| Call History Count (COUNT) | C | Contains a modulo-64 event counter maintained by the MS, the AC, and, optionally, the VLR. It is used for clone detection. The events that result in the counter being incremented are defined by the AC and, optionally, the VLR. They may include initial registration in a new serving MSC, call origination, page response, or expiration of a timer. |

FIG. 10

METHOD AND APPARATUS FOR CONFIGURATION OF AUTHENTICATION CENTER OPERATIONS IN A MOBILE TELEPHONE SYSTEM

RELATED APPLICATIONS SECTION

This application is a continuation of U.S. patent application Ser. No. 08/781,258, filed on Jan. 11, 1997, the content of which is incorporated by reference herein in its entirety.

The following applications are related to the subject application. Each of the following applications is incorporated by reference herein.

1. U.S. application Ser. No. 08/781,262 entitled "Method and Apparatus for Providing Switch Capability Mediation in a Mobile Telephone System," of Lamb et al., filed Jan. 11, 1997;

2. U.S. application Ser. No. 08/781,264 entitled "Method and Apparatus for Providing Fraud Protection Mediation in a Mobile Telephone System," of Lamb, filed Jan. 11, 1997;

3. U.S. application Ser. No. 08/781,259 entitled "Method and Apparatus for Implementing Alias Mobile ID Numbers in a Mobile Telephone System," of Lamb, filed Jan. 11, 1997;

4. U.S. application Ser. No. 08/781,261 entitled "Method and Apparatus for Implementing Configurable Call Forwarding Bins in a Mobile Telephone System," of Lamb, filed Jan. 11, 1997;

5. U.S. application Ser. No. 08/781,260 entitled "Method and Apparatus For Automated SSD Updates on an A-Key Entry In a Mobile Telephone System," of Jacobs, filed Jan. 11, 1997;

6. U.S. application Ser. No. 08/780,830 entitled "Method and Apparatus for Configuration of Authentication Center Operations Allowed by MSCID in a Mobile Telephone System," of Jacobs et al., filed Jan. 11, 1997; and 7. U.S. application Ser. No. 08/781,263 entitled "Method and Apparatus for Authentication Directive Initiation Limits in a Mobile Telephone System," of Jacobs, filed Jan. 11, 1997.

BACKGROUND OF THE INVENTION

The invention generally relates to a wireless communication network, and more particularly, relates to an improved authentication center (AC) component in a wireless communication network.

Wireless communication is one of the fastest growing segments of the telecommunication industry. With the mobility of the wireless devices, such as cellular phones and pagers, a subscriber to a wireless service can make or receive a call, or receive a message without being restricted to any particular locations. Because of the convenience provided by wireless devices, they have been widely used by average consumers.

Airtime fraud is a costly problem for wireless communications providers (also called "operators"). Callers (also called "subscribers") can gain unauthorized access to cellular networks by "cloning" legitimate cellular phones (also called "handsets," "Mobile Stations," or "MSs"). The cloning process duplicates the memory contents of a legitimate cellular phone so that the clone cellular phone appears to be legitimate to the rest of the system. In certain high crime areas, large numbers of cellular phone calls are estimated to be placed from cloned handsets. The challenge to cellular telephone companies lies in determining whether a handset communicating with the system is a legitimate handset or a clone.

In the past, operators could only detect fraudulent access after the fact. The detection process involved labor-intensive post-call analysis and did not stop cloned handsets from fraudulently obtaining service. Currently, many conventional cellular systems include one or more Authentication Center (AC) portions. When a calling person activates a handset, the AC checks the profile of the person who is registered for the handset. The AC then initiates a challenge to the handset. If the handset's response matches the AC's challenge, network access is granted. Otherwise, access is denied. The authentication process greatly reduces airtime losses and serves as a deterrent to the crime of cloning.

In many cellular phone systems, the AC performs authentication in connection with the following events: registration (when a phone roams into a new area); origination of a call; flashing (which involves, e.g., three-way calling, call waiting, or paging); and call termination. In general, the MSC (Mobile Switching Center) associated with the area of the handset being authenticated sends an authentication request (AUTHRQST) message to the AC for each of these events.

To further authenticate handsets, conventional ACs periodically send "Shared Secret Data (SSD) update" messages and "unique challenge" messages to MSC/VLRs in the system. These messages (also called "authentication messages") are defined in the ANSI IS-41 standard produced by TIA/EIA for cellular telephones, which is herein incorporated by reference.

Most systems include MSC/VLRs from various vendors and not all the MSC/VLRs in a system operate in the same way. For example, the MSC/VLRs of some vendors perform SSD updates and unique challenge operations via a radio control channel in an connected base station, which communicates with the handset. The MSC/VLRs of other vendors use a voice channel already in use by the system. To preserve precious resources, systems using a voice channel will perform SSD updates and unique challenges only when a call is in progress and a voice channel is currently assigned to the mobile handset. Thus, for example, in conventional systems, the AC sends an order to perform an operation such as an SSD update or a unique challenge in response to an AUTHRQST message during registration of a handset. If base stations assigned to an MSC/VLR in whose region the handset is located use a voice channel, the MSC/VLR will not perform the operation because no voice channel is yet assigned. The MSC/VLR will, however, send a message notifying the AC that the operation was not attempted. Similarly, when a voice call is in progress, if the AC sends an order to perform one of these operations to an MSC/VLR whose base stations use the control channel for responses, the MSC/VLR will not perform the operations. The MSC/VLR will, however, send a message notifying the AC that the operation was not attempted. In both cases, the notification sent by the MSC/VLR creates additional traffic in the system and misappropriates precious network resources.

Although ACs of conventional systems order SSD update and unique challenge operations any time the need for them is detected, such conventional systems do not take into consideration that the MSC/VLRs are not always in a position to perform these operations. What is needed is a way to reduce traffic caused by these extra messages.

SUMMARY OF THE INVENTION

The present invention provides a method and apparatus for allowing an Authentication Center (AC) to order SSD update and unique challenge operations only if the receiving MSC/VLR is receptive to performing them. The AC has access to an MPCM file that indicates the circumstances under which each MSC/VLR in the system will perform SSD updates and unique challenges. Thus, whenever the AC determines that it is desirable to send either an SSD update or a unique challenge, the AC fast checks the MPCM file to determine whether the message should be sent. If the database indicates that the MSC/VLR will not attempt the operation, the AC does not request the operation.

The MPCM file holds configuration information for each MSC/VLR in the system. If, for example, an MSC/VLR performs SSD updates and challenges via a voice channel, entries in the MPCM file will indicate that no SSD updates or unique challenges should be sent during registration (since no voice channel is available). Similarly, if an MSC/VLR performs to SSD updates and challenges via a control channel, entries in the MPCM file will indicate that no SSD updates or unique challenges should be sent during a call (since the control channel is controlling the call in progress).

The fact that the AC only issues these orders when the MSC/VLRs are receptive to performing them, saves system resources, potentially reducing the amount of network traffic by tens of thousands of messages per day. In addition to the reduction of network traffic, both the AC and the MSC/VLRs are made more efficient by not having to process these messages. The AC also gains efficiency because it does not have to perform housekeeping functions for the messages that it does not send.

In accordance with the above discussion, the present invention includes a method for sending an authentication messages in a cellular telephone system, comprising the steps, performed by a processor of an Authentication Center (AC) portion of the system, of: determining that an authentication message needs to be sent to a subscriber; accessing a database for an MSC/VLR associated with the subscriber to determine whether the MSC/VLR will act in accordance with an authentication message if one is sent; sending the authentication message to the MSC/VLR if the determination of the accessing step is positive; and refraining from sending the authentication message to the MSC/VLR if the determination of the accessing step is negative.

A fuiller understanding of the invention will become apparent and appreciated by referring to the following description and claims taken in conjunction with the accompanying drawings.

BRIEF DESCRIPTION OF THE DRAWINGS

FIGS. 7(a) and 7(b) show parameters of an Authentication Request (AUTHRQST) message.

FIGS. 8(a) and 8(b) show parameters of a response to an Authentication Request (AUTHRQST) message.

FIGS. 9(a) and 9(b) show parameters of an Authentication Directive (AUTHDIR) message.

FIG. 10 shows parameters of a response to an Authentication Directive (AUTHDIR) message.

DETAILED DESCRIPTION OF THE PREFERRED EMBODIMENTS

A. General Discussion of Cellular Telephone Technology

The following section provides an overview of cellular telephone technology and serves as a prelude to a more specific discussion of the present invention.

1. System Overview

Wireless communications are provided through a wireless communication network, which can be realized, for example, as a Signaling System 7 (SS7) network. The SS7 network uses the EIA/TIA Interim Standard 41 (IS-41) protocol, which is the standard commonly used in North America. A description of the SS7 network and the IS-41 protocol can be found in Signaling System #7, by Travis Russell, and *The Mobile Communications Handbook,* by Jerry Gibson, both of which are hereby incorporated by reference.

Figure 1:
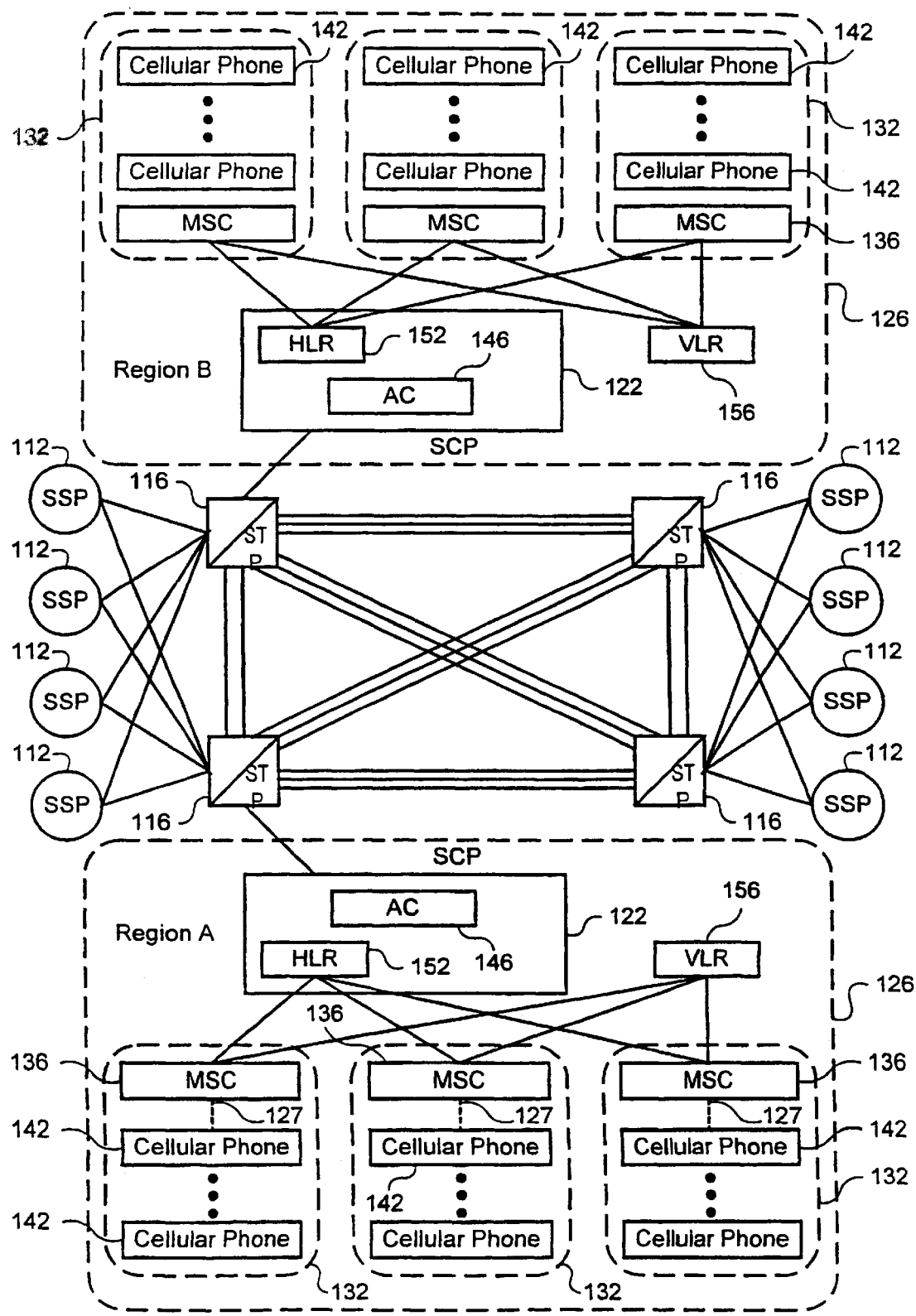
FIG. 1 depicts a typical SS7 communication network.

The SS7 network is used for switching data messages pertaining to connecting telephone calls and for maintaining the signaling network. As shown in FIG. 1, the SS7 network 100 has three different types of nodes or signaling points: Service Switching Point (SSP) 112, Signal Transfer Point (STP) 116, and Service Control Point (SCP) 122.

An SSP 112 is an local exchange in the telephone network. An SSP 112 uses the information provided by the calling party (such as dialed digits) and determines how to connect the call. An STP 116 serves as a router in the SS7 network and switches SS7 messages as received from the various SSPs 112 through the network to their appropriate destinations. An STP 116 receives messages in packet form from an SSP 112. These packets are either related to call connections or database queries for an SCP 122. If the packet is a request from an SSP 112 to connect a call, the message must be forwarded to the destination where the call will be terminated. The destination is determined by the dialed digits. If the message is a database query seeking additional information regarding a person who subscribes a wireless service, i.e., a "subscriber", the destination will be a database. Access to telephone company databases is provided through an SCP 122. These databases are used to store information about subscribers' services, calling card validation, fraud protection, etc.

As shown in FIG. 1, the wireless network is shared by multiple regions 126, such as regions A and B. In each region 126, an SCP 122 is provided. Each region 126 is further divided into a number of registration areas 132, each of which is served by a Mobile Switching Center (MSC)

136. An MSC 136 provides wireless communication services to all properly registered cellular phones 142 in the registration area.

As illustrated in FIG. 1, an SCP 122 contains an Authentication Center (AC) 146 and a Home Location Register (HLR) 152. AC 146 authenticates a subscriber's cellular phone through the use of a number called the A-Key. HLR 152 is used to store information regarding cellular subscribers in the region for which it provides services. HLR 152 also stores information regarding billing, as well as information identifying the services allowed for each subscriber. In addition to these, HLR 152 stores the current locations of cellular phones 142 of those subscriber's who activated their cellular phones through a wireless service provider in the region the HLR serves. This region is also referred to as the "home area" of those subscribers. Although not shown, a backup HLR is also provided in SCP 122. A VLR 156 is used when a cellular phone 142 is not recognized by a local MSC/VLR 156 stores the current locations for the visiting subscribers.

Each cell phone (MS) connects to abase station through a connection 127. A MSC/VLR connects to one or more base stations. This connection includes a voice channel and a control channel, which is usually implemented as a radio channel. As discussed below, the types of information sent over the voice channel and the control channel vary between MSC/VLRs from different manufacturers.

2. Registration and Roaming

Figure 2:
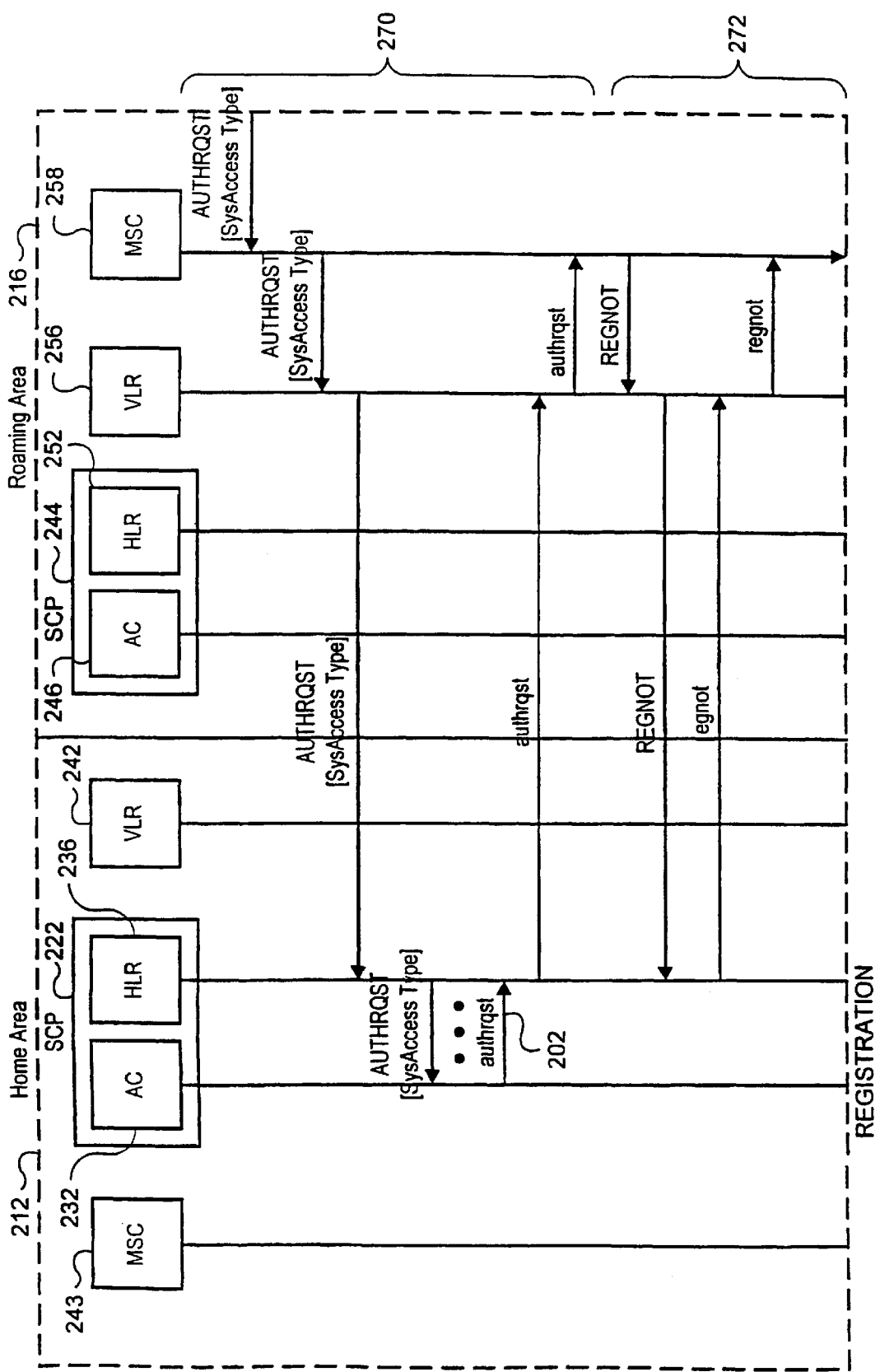
FIG. 2 is a flow diagram of steps performed when a roaming cellular telephone enters a new roaming area.

FIG. 2 illustrates registration of a cellular phone that has "roamed" outside of its home area 212 into a roaming area 216. Home area 212 and roaming area 216 correspond to two regions, such as regions A and B, respectively, shown in FIG. 1. In home area 212, an SCP 222 includes an AC 232 and a HLR 236. An MSC 243, having an associated VLR 256 (jointly called an "MSC/VLR"), is also located in home area 212. In roaming area 216, an SCP 244 includes an AC 246 and a HLR 252. An MSC 258 is also located in roaming area 216. In FIG. 2, although MSCs are shown as separate entities from the HLR and VLR in the respective areas, in a actual application the HLR/VLR functions may be integrated with the MSCs.

When an MSC/VLR detects that a phone capable of authentication has roamed into its area, the MSC/VLR sends Authentication Request (AUTHRQST) messages to the AC. As shown in FIG. 2, when a cellular phone roams into a new area, it sends an AUTHRQST message, which is received by the MSC 258 for the area. MSC 258 and AC 232 exchange a plurality of AUTHRQST messages 270, and the AC sends back a response indicating whether the phone is allowed to operate in the new area (In FIG. 2, responses to messages are indicated by lower case letters). After the phone has been authenticated, it registers its location with its home HLR 222, as shown by messages 272. Both AUTHRQST and REGNOT messages are well-known to persons of ordinary skill in the art and will not be described in detail herein.

3. Call Origination

Figure 3:
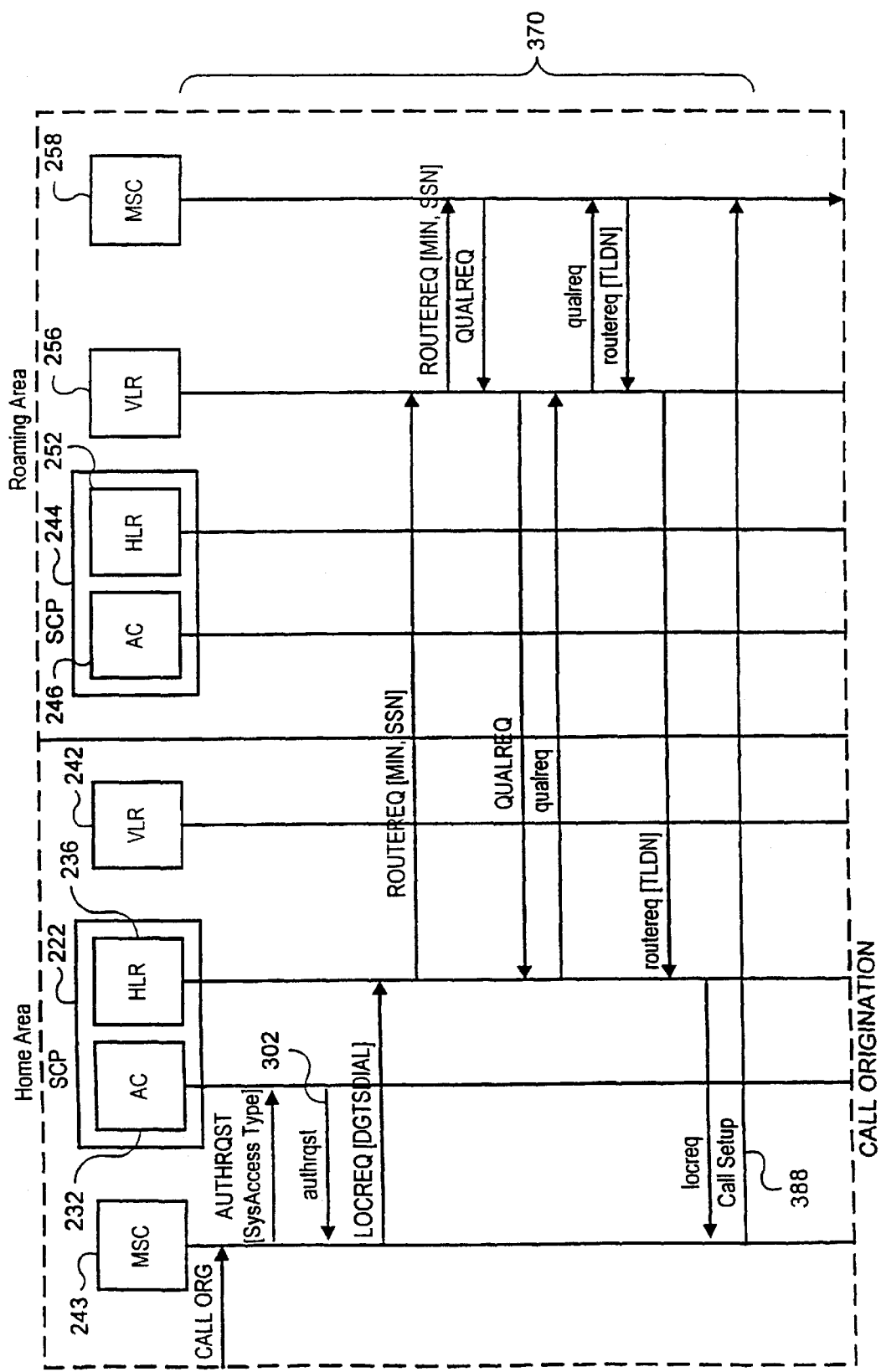
FIG. 3 is a flow diagram of steps performed when a call is made from one area to another.

As shown in FIG. 3, when a calling party desires to place a call to a receiving party, the phone sends a call origination (CALL ORG) message, which includes the digits of the phone number to be dialed. Again, the MSC/VLR and AC exchange AUTHRQST messages, to ensure that the calling phone has authorization to place a call.

Originating MSC 243 sends a location request (LOCREQ) message containing the dialed digits to HLR 236 in home area 212. Upon receiving the dialed digits, the HLR 236 accesses its internal data structures to find the associated Mobile Identification Number (MIN) for the receiving party's cellular phone in the SUBS file to determine if the receiving party is a legitimate subscriber. HLR 236 sends a routing address request (ROUTREQ) message to VLR 256 in roaming area 216 where the receiving party's cellular phone is currently registered. The current location information about the receiving party's cellular phone was sent to HLR 236 by VLR 256 after the receiving party arrived the roaming area and the cellular phone registered with VLR 252. The ROUTREQ message contains the associated MIN of the receiving party's cellular phone. VLR 256 then forwards the ROUTREQ to MSC 258 currently serving the receiving party's cellular phone. MSC 258 is also referred to as a serving MSC. In response to the ROUTREQ, serving MSC 258 consults its internal data structures to determine if the receiving party's cellular phone is already engaged in a call on this MSC. Assuming that the cellular phone is not known to serving MSC 258, serving MSC 258 may then obtain the receiving party's profile from its VLR 256 by sending it a qualification request (QUALREQ) message. If the receiving party's cellular phone is unknown to VLR 256 or if the information requested is not available at VLR 256, VLR 256 sends the QUALREQ message to HLR 236 in home area 212. HLR 236 then sends a qualreq response to VLR 256. The qualreq response contains relevant information about the receiving party's profile. VLR 256 in turn sends the qualreq response to serving MSC 258. Upon receiving the qualreq, serving MSC 258 allocates a temporary identifier TLDN (Temporary Local Directory Number) and returns this information to VLR 256 in the routreq message. VLR 256 in turn sends the routreq message to HLR 236. When the routreq message is received by HLR 236, it returns a locreq response to originating MSC 243. The locreq response includes routing information including the MSCID of serving MSC 258 and the TLDN. Finally, originating MSC 243 establishes a voice path to serving MSC 258 using existing interconnection protocols (e.g., SS7) and the routing information specified in the locreq response, as illustrated at step 388.

4. SSD Updates and Unique Challenges

The described embodiment of the present invention uses the CAVE (Cellular Authentication and Voice Encryption) algorithm to authenticate cellular phones in the system. The CAVE algorithm is described, for example, in TR-45, which is herein incorporated by reference. Using the CAVE algorithm, the AC periodically orders an MSC/VLR to perform one or both of an SSD update or a unique challenge operation. These orders are typically included as a part of other messages sent by the AC. For example, in FIGS. 2 and 3, the AC may issue SSD update orders and unique challenge orders as a part of any of the messages it sends to an MSC/VLR. Thus, for example, authrqst message 202 of FIG. 2 may or may not include an order to perform an SSD update or to perform a unique challenge. Similarly, authrqst message 302 of FIG. 3 may include such orders if the AC determines that they are needed for a particular subscriber. The format of these orders are discussed below. The parameters of an authrqst response is discussed below.

Figure 4A:
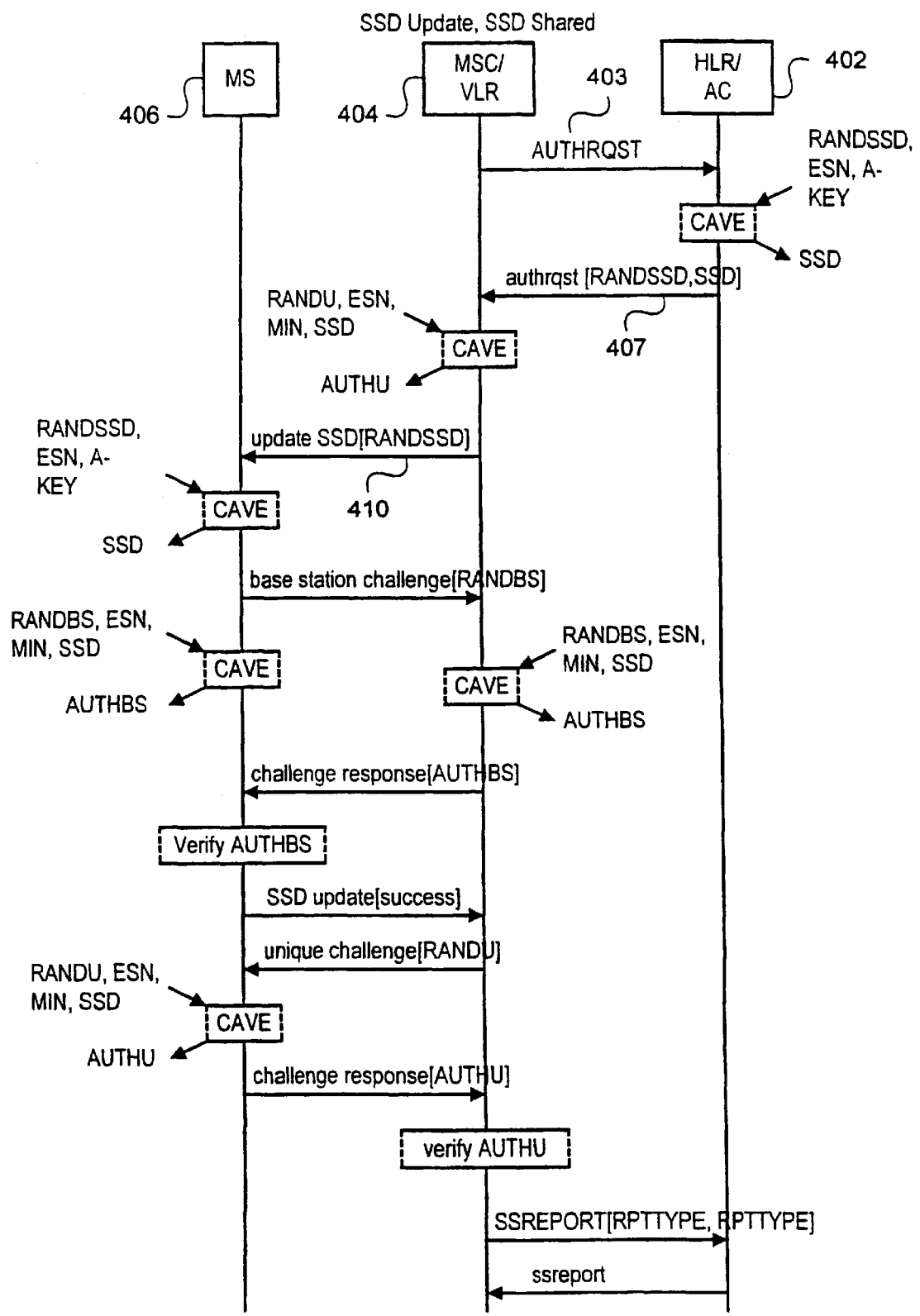
FIG. 4(a) is a flow diagram of an SSD update operation when the system allows an AC to share Shared Secret Data (SSD) with an MSC.
Figure 4B:
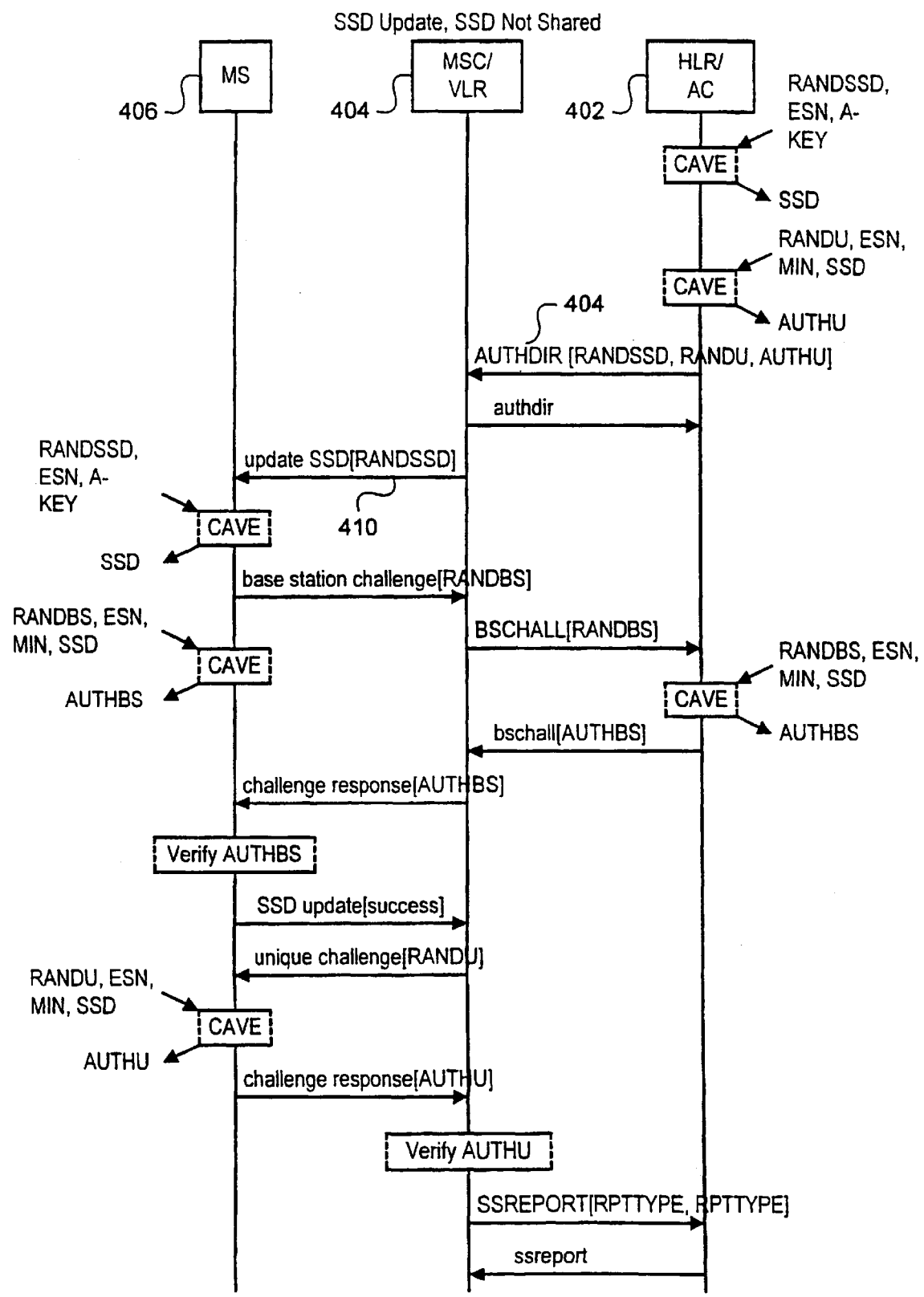
FIG. 4(b) is a flow diagramn of an SSD update operation when the system does not allow an AC to share Shared Secret Data (SSD) with an MSC.

FIG. 4(a) is a flow diagram of an SSD update operation when the system allows the AC to share SSD (Shared Secret Data) with the VLR. In contrast, FIG. 4(b) is a flow diagram of an SSD update operation when the system does not allow an AC to share SSD. FIGS. 4(a) and 4(b) also include a handset (called a "Mobile Station" or "MS") 406. SSD is a parameter defined in the IS-41 standard. It is used as an intermediate input value to the CAVE algorithm and is stored in both the AC and MS. As indicated in the figures, some MSC/VLRs are allowed to have access to SSD and some are not, depending on how the system is configured.

In FIG. 4(a), the orders to perform an SSD update (and a unique challenge) are incorporated into the authrqst response messages 407. The format of an authrqst response message is discussed below. In FIG. 4(b), the orders to perform an SSD update (and a unique challenge) are incorporated into the AUTHDIR message 404. The format of an AUTHDIR message is discussed below. The specific messages sent during SSD update are not the subject of the present invention. Instead, the present invention is directed toward whether an SSD update order and/or a unique challenge order should be sent to specific MSC/VLRs under specific circumstances.

5. Authentication Center (AC)

Figure 5:
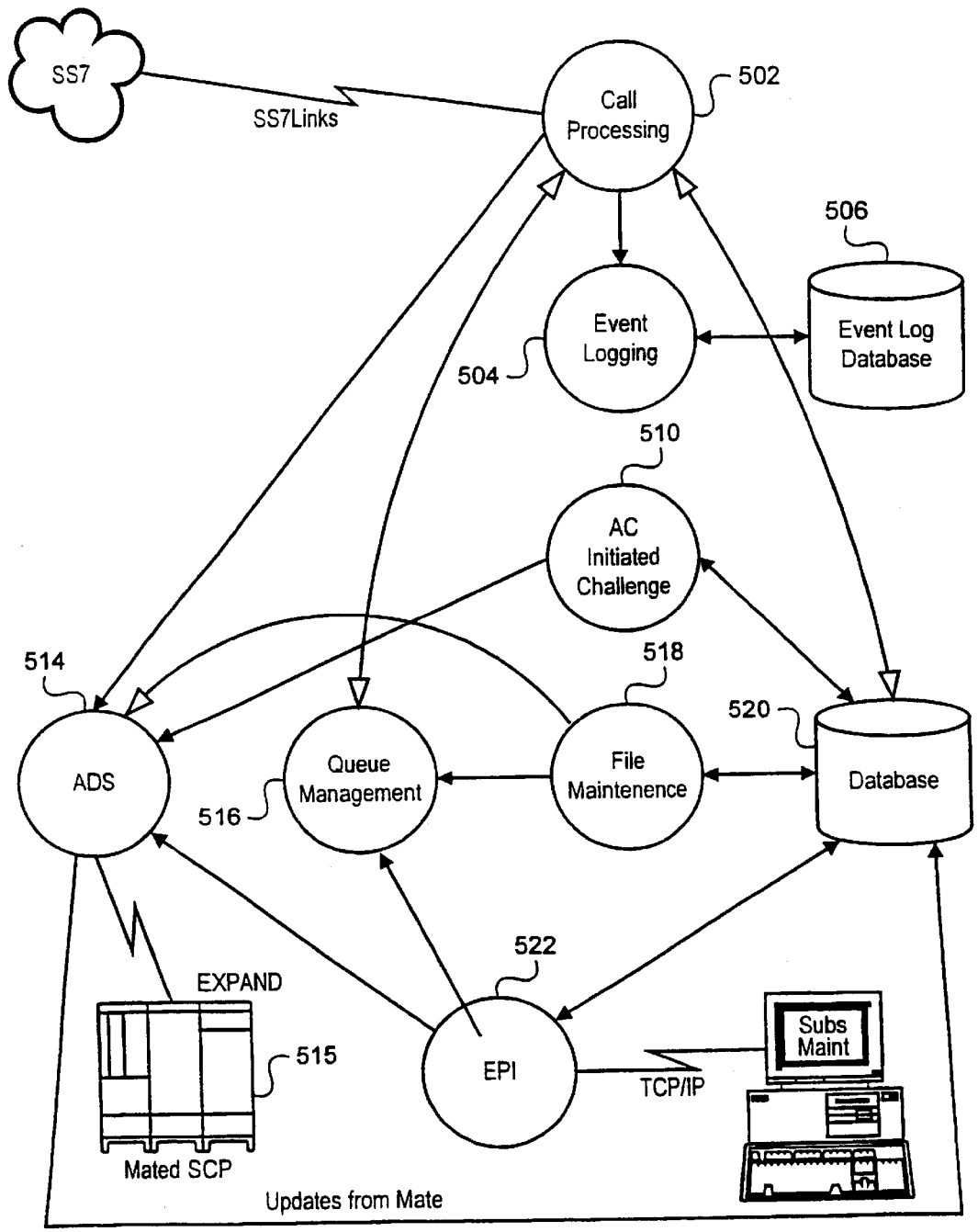
FIG. 5 is a block diagram of subsystems in an AC of a preferred embodiment of the present invention.

FIG. 5 is a block diagram of subsystems in an AC of a preferred embodiment of the present invention. It will be understood that each of the subsystems of FIG. 5 is implemented as software instructions stored in a memory (e.g., database 520) and executed by a processor (e.g., processor 502). An AC Call Processing subsystem 502 is responsible for processing of authentication TCAP messages. Thus, AC call processing subsystem 502 handles the following IS-41 authentication messages and associated responses:

Authentication directive,
Authentication Failure Report,
Authentication Request,
Authentication Status Report,
Base Station Challenge,
Security Status Report.

Each of the above messages (except the Base Station Challenge) can contain orders for an SSD update and/or a unique challenge. Processing of messages includes message parsing, message validation, decision logic processing, event generation, statistics generation, message creation, message sending and database accessing and updating. Inbound messages are received from an HLR. Responses to a message is returned to the same HLR. Outbound messages are preferably generated from the processing of a queue message received from a Queue Management Facility (external to the AC).

AC Call Processing subsystem 502 is also responsible for generation of various required random numbers and the generation of Shared Secret Data (SSD). The AC Call Processing subsystem preferably supports the Authentication Algorithm Version C7, and is structured such that the library routines used for the CAVE algorithm and for random number generation can be easily replaced or enhanced. Subsystem 502 also includes library routines for the encryption/decryption of sensitive data used by the CAVE algorithm.

AC Call Processing subsystem 502 will also receive challenge due notification messages from an AC Initiated Challenge subsystem 510 via the external Queue Management Facility. These messages include "Initiate Immediate SSD Update" and "Initiate Unique Challenge" events.

AC Call Processing subsystem 502 is also responsible for the generation of log events to be sent to the AC Event Logging subsystem 504 for collection and recording in database 506.

An ADS Subsystem 514 is responsible for communicating with a "mated" SCP 515 and for ensuring that the databases of the two systems remain in synch. An External Provisioning Interface (EPI) 522, available from Tandem Computers, Inc., provides subscriber and subscriber data using ITU-T ANS.1 standard messages.

AC Initiated Challenge subsystem 510 is composed of the AC Initiated Challenge Process, which is responsible for the Authentication Center initiation of periodic authentication verification and SSD updates on a per subscriber basis. AC Initiated Challenge subsystem 510 uses the configuration information provided by an Authentication System Parameters (ACSP) file to determine whether or not periodic unique challenges are in effect, whether or not periodic SSD updates are in effect, and to determine the associated frequency and interval characteristics of the updates and challenges.

To help reduce fraud by randomizing these operations, the amount of time between challenges initiated by the AC Initiated Challenge subsystem 510 is variable based upon the last authentication attempt timestamps from the Subscriber Authentication Profile File (SUBA) and upon the AC initiated challenge frequency and interval width information configured in the ACSP file. The AC initiated frequency is defined as the desired average frequency of occurrence of a challenge. The AC initiated challenge interval width is defined as the total width of the interval for the AC initiated frequency. For example, if the authentication challenge had an AC initiated frequency of 120 minutes and an AC initiated interval width of 60 minutes, the authentication challenges for a particular subscriber would occur randomly between 90 and 150 minutes.

The AC Initiated Challenge Process will sequentially examine each subscriber in the Subscriber Authentication Profile File (SUBA) to determine if it is time to initiate a unique challenge or SSD update for the subscriber. For each SUBA record, the AC Initiated Challenge Process 510 calculates the subscriber's "time to do unique challenge", and "time to update SSD". If any of these calculated timestamps are less than or equal to the current timestamp, the AC Initiated Challenge Process 510 will update the subscriber record to indicate the operation is needed. The operation will then be performed on the next access of the system by the subscriber. The formulas for the calculation of these subscriber challenger timestamps are defined below.

Multiple copies of the AC Initiated Challenge process 510 can be configured for each SCP node with each copy having a subset of the Subscriber Authentication Profile File (SUBA). The subsets will be partitioned among the various copies of the AC Initiated Challenge Process based upon the primary key of the SUBA file. This partitioning methodology allows for balanced workload and prevents I/O contention on the SUBA file.

The following formulas are used for the calculation of the three subscriber challenge timestamps:

LADT=last unique challenge attempt timestamp from the subscriber SUBA record

LSDT=last SSD update attempt timestamp from the subscriber SUBA record

AF=AC initiated unique challenge frequency ($X_1$) from ACSP file (minutes)

AV=AC initiated unique challenge width ($X_2$) from ACSP file (minutes)

SF=AC initiated SSD update frequency ($X_2$) from ACSP file (days)

SV=AC initiated SSD update width ($X_2$) from ACSP file (days)

R=Random number between 0 and 1

The "time to do unique" challenge timestamp is calculated as follows;

$$LADT+AF+(R-0.5)*AV$$

The "time to update SSW challenge timestamp is calculated as follows;

LSDT+SF+ (R−0.5)*SV

B. Selective Sending of SSD Updates and Unique Challenges

Figure 6:
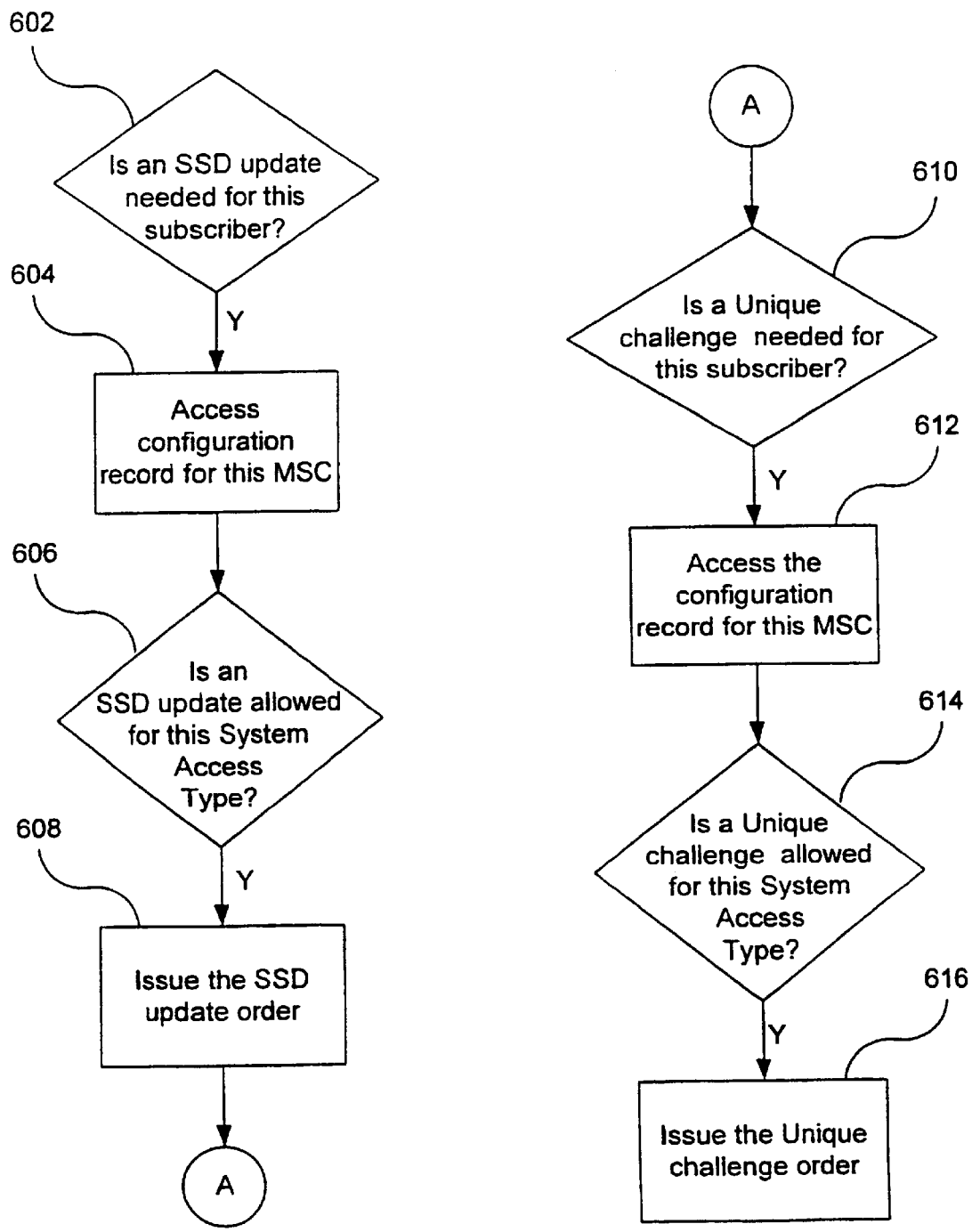
FIG. 6 is a flow chart showing step performed by the AC in accordance with a preferred embodiment of the present invention.

FIG. 6 is a flow chart showing step performed by the AC in accordance with a preferred embodiment of the present invention. A general discussion is followed by a detailed discussion of message and file formats and by an example. Columns marked either "R" or "C" indicate that the field is required or contingent (optional).

Figure 14:
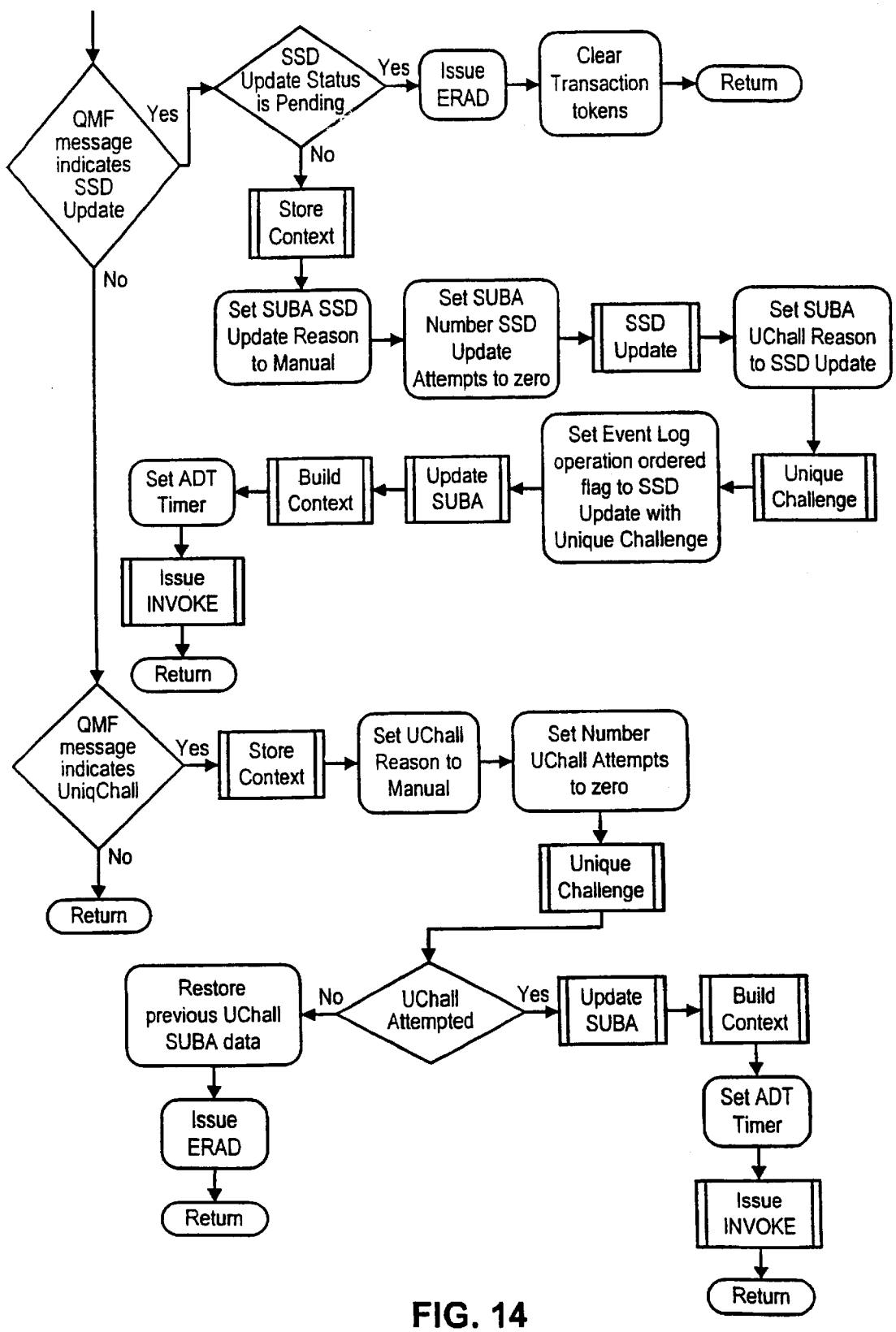
FIG. 14 is a flowchart of steps performed by the AC to order an SSD update and to order a unique challenge.

Before the AC sends a message, the AC Call Processing subsystem 510 determines, in step 602, whether an SSD update event is required for the subscriber to whom the message is directed. If so, in step 604, the AC accesses a record in the MPCM file for the MSC from which the message was received to determine whether an SSD update is allowed for the system access type. If the record in the MSPCM file indicates that an SSD update is allowed for the system access type message to be sent, then, in step 608, the AC orders the SSD update to be included in the message to be sent (as shown in FIG. 14).

Similar steps are performed if a unique challenge event is needed for the subscriber. Before the AC sends a message, the AC Call Processing subsystem 510 determines, in step 610, whether a unique challenge event is required for the subscriber associated with the message. If so, in step 612, the AC accesses a record in the MPCM file for the MSC/VLR from which the message was received to determine whether a unique challenge is allowed for the system access type. If the record in the MPCM file indicates that a unique challenge is allowed for the system access type message to be sent, then, in step 616, the AC orders the unique challenge to be included in the message to be sent (as shown in FIG. 14).

As discussed above, the AC sends SSD updates and unique challenges as a part of several different types of messages. The following section describes message and file formats used by the steps of FIG. 6. These formats are known to persons of ordinary skill in the art and are included here for clarity of example. Only relevant fields are discussed. Columns marked either "R" or "C" indicate that the field is required or contingent (optional).

FIGS. 7(a) and 7(b) show parameters in an Authentication Request (AUTHRQST) message. This message is sent from an MSC/VLR to the AC. Mobile Identification Number (MIN) 702 identifies the subscriber making the request. Steps 602 and 604 of FIG. 6 check flags 1106 and 1110 of FIG. 11 to determine whether an SSD update or unique challenge needs to be sent for the subscriber having the MIN in field 702. Alternate embodiments may use additional methods to determine if an SSD update or unique challenge needs to be sent.

A system Access Type 704 identifies the type of system access made by the MS. In the described embodiment, the possible system access types are:

| 0 | not used |
|---|---|
| 2 | Flash request |
| 1 | Unspecified |
| 3 | Autonomous registration |
| 4 | Call origination |
| 5 | Page response |
| 6 | No access |
| 7 | Power down registration |
| 8 | SMS page response. |

Steps 606 and 614 of FIG. 6 access this field to determine the operation that the MS wants authorization to perform.

An MSCID 706 indicates the ID of the MSC/VLR forwarding the AUTHRQST message. Steps 604 and 612 access the MPCM file using this MSCID as a key to determine the system access types for which the particular MSC/VLR will perform to an SSD update or a unique challenge.

FIGS. 8(a) and 8(b) show parameters of a response to an Authentication Request (AUTHRQST) message of FIG. 7. This response is returned by the AC in response to an AUTHRQST sage from an MSC/VLR and may include an SSD update and/or a unique challenge. When the AC issues an SSD update order in step 608 of FIG. 6, values are placed in RANDSSD field 804. When the AC issues a unique challenge order in step 616 of FIG. 6, values are placed in AUTHU field 802, RANDU field 804. In this way, the SSD update or unique challenge is passed to the MSC/VLR with the AC's response to the AUTRQST message. This SSD will also be sent if it is to be shared.

FIGS. 9(a) and 9(b) show parameters of an Authentication Directive (AUTHDIR) message. This message is sent from the AC to an MSC/VLR. Steps 602 and 604 of FIG. 6 use a MIN later stored in field 902 to determine whether an SSD update or unique challenge needs to be sent for the subscriber. Steps 604 and 612 access the MPCM file using this MSCID as a key to determine the conditions that the particular MSC/VLR will perform an SSD update or a unique challenge and may include an SSD update and/or a unique challenge. When the AC issues an SSD update order in step 608 of FIG. 6, values are placed in RANDSSD field 904. When the AC issues a unique challenge order in step 616 of FIG. 6, values are placed in AUTHU field 903, RANDU field 904, and SSD field 908. In this way, the SSD update or unique challenge is passed to the MSC/VLR with the AC's response to the AUTHRQST message.

FIG. 10 shows parameters of a response to an Authentication Directive (AUTHDIR) message.

Figure 11:
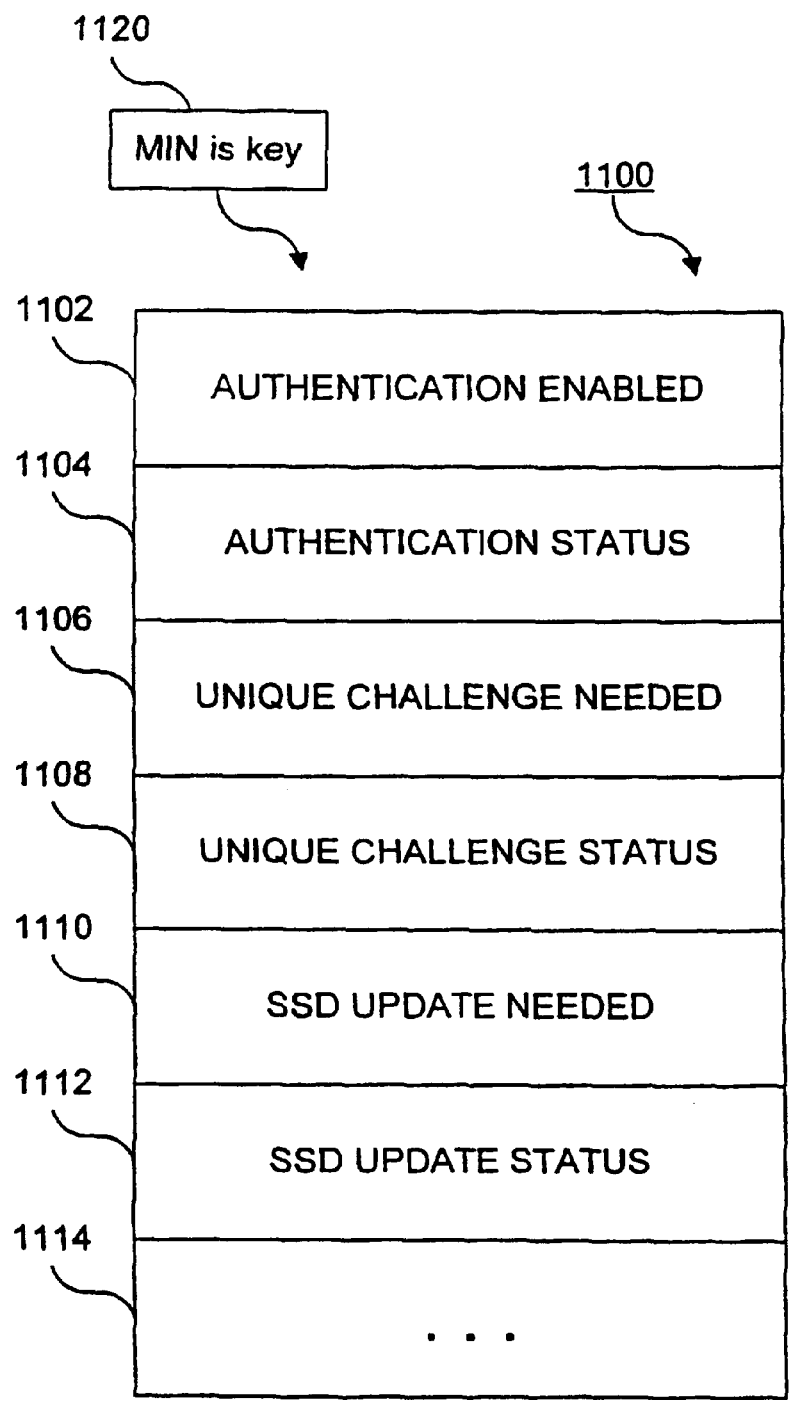
FIG. 11 shows a format of flag bits in a Subscriber (SUBA) file.

FIG. 11 shows a format of flag bits in a Subscriber (SUBA) file. As discussed above, the MIN for each subscriber is used as a key for this file. The flags include an authentication enabled flag 1102, indicating whether the AC is to perform authentication for the subscriber; an authentication status flag 1104; a unique challenge needed flag 1106; a unique challenge status flag 1108; an SSD update needed flag 1110; and an SSD update status flag. Other flags exist that are not shown in the Figure.

Figure 12A:
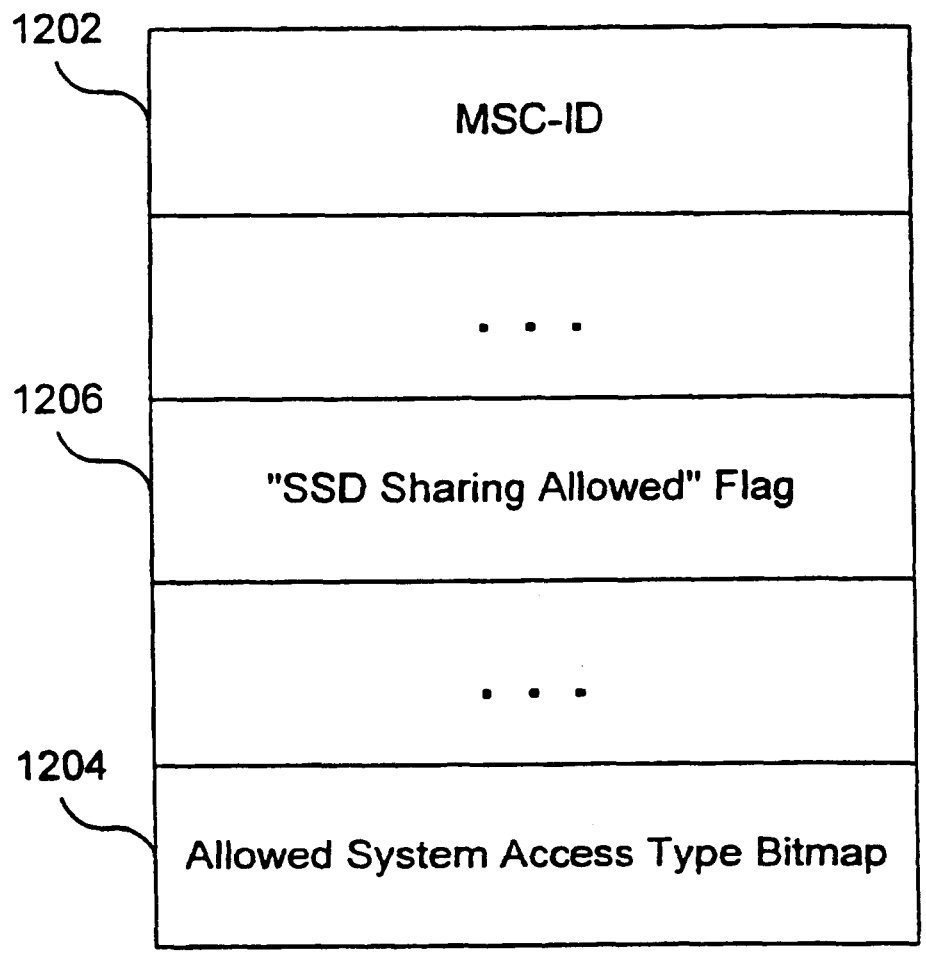
FIGS. 12(a) and 12(b) show a format of an entry in an MSC Point Code Map (MPCM) file.

FIGS. 12(a) and 12(b) show a format of an entry in an MSC Point Code Map (MSPCM) file, which uses an MSC ID as a key. An "SSD Sharing allowed flag" 1206 indicates whether SSD should be shared with this MSC/VLR. Each entry in the MPCM preferably includes two bytes of flags 1204, which are shown in detail in FIG. 12(b). Byte 1 contains the following flags:

H=reserved
G=Reserved
F=Page response for SSD update
E=Call origination for SSD update
D=Autonomous registration for SSD update
C=Flash for SSD update B=Unspecified for SSD update
A=Other for SSD update
Byte 0 contains the following flags:
   H=Reserved
   G=Reserved
   F=Page response for unique challenge
   E=Call origination for unique challenge
   D=Autonomous registration for unique challenge
   C=Flash for Unique challenge
   B=Unspecified for unique challenge
   A=Other for unique challenge
In these flags, "0" is false and "1" is true.

Figure 12:
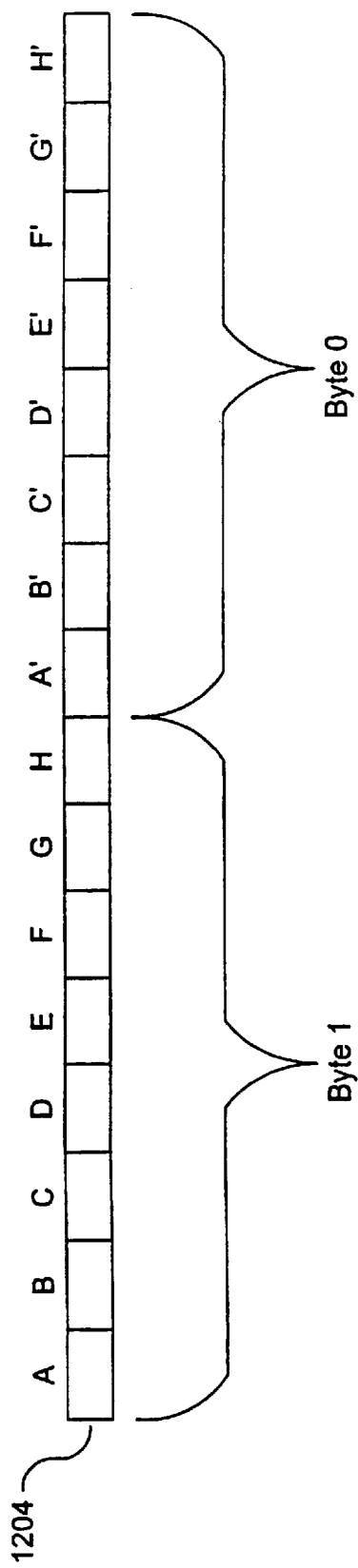
Figure 13:
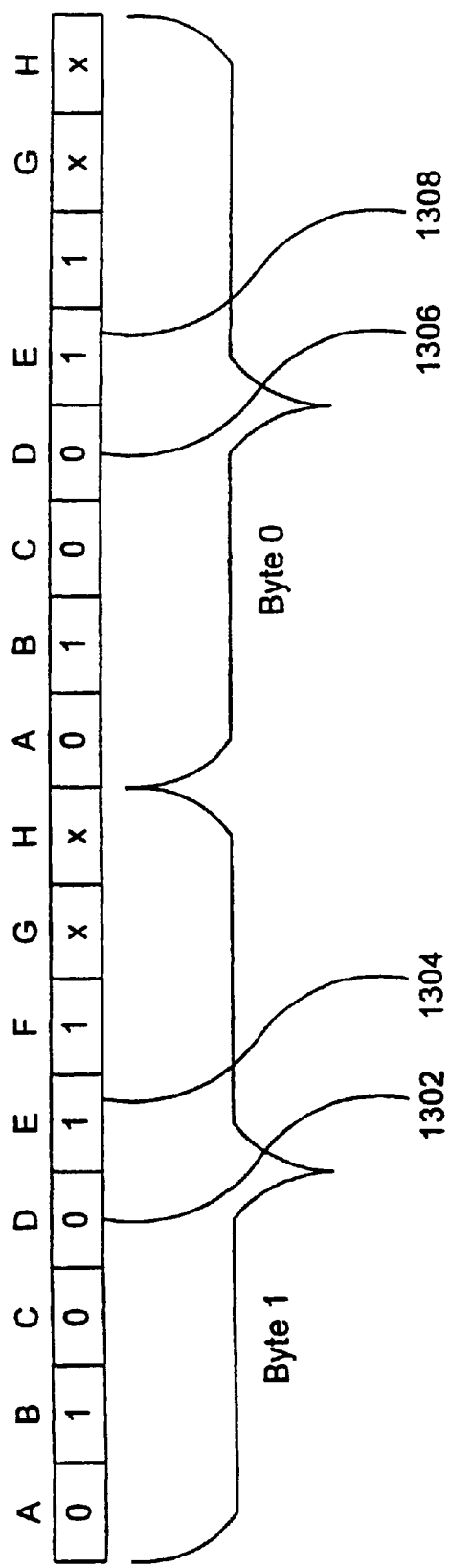
FIG. 13 show an example of values for flags of FIG. 12(b).

FIG. 13 show an example of values for flags of FIG. 12(b). In the example, flag 1304 indicates that the MSC/VLR having the MSC ID in field 1202 of FIG. 12 will initiate SSD updates sent in response to a call origination message (as indicated by system access type field 704 of FIG. 7(a)). Flag 1302 indicates that the MSC/VLR will not perform SSD updates sent in response to an autonomous registration message. Flag 1308 indicates that the MSC/VLR will perform a unique challenge sent in response to a call origination message. Flag 1306 indicates that the MSC/VLR will not perform a unique challenge sent in response to an autonomous registration message. Thus, in the example, the AC will send an SSD update and a unique challenge for this MSC/VLR when the message is a call origination message, but not when the message is an autonomous registration message. In the example, a human operator has initially set the bits of FIG. 12(b) to indicate the capabilities of the MSC/VLR sending the message.

Thus, for example, an MSC/VLR that uses a voice channel to order SSD updates will have a "0" in flag 1302, while an MSC/VLR that uses a radio channel to initiate MSC/VLR updates will have a "1".

FIG. 14 is a flowchart of steps performed by the AC to order an SSD update and to order a unique challenge.

Figure 15:
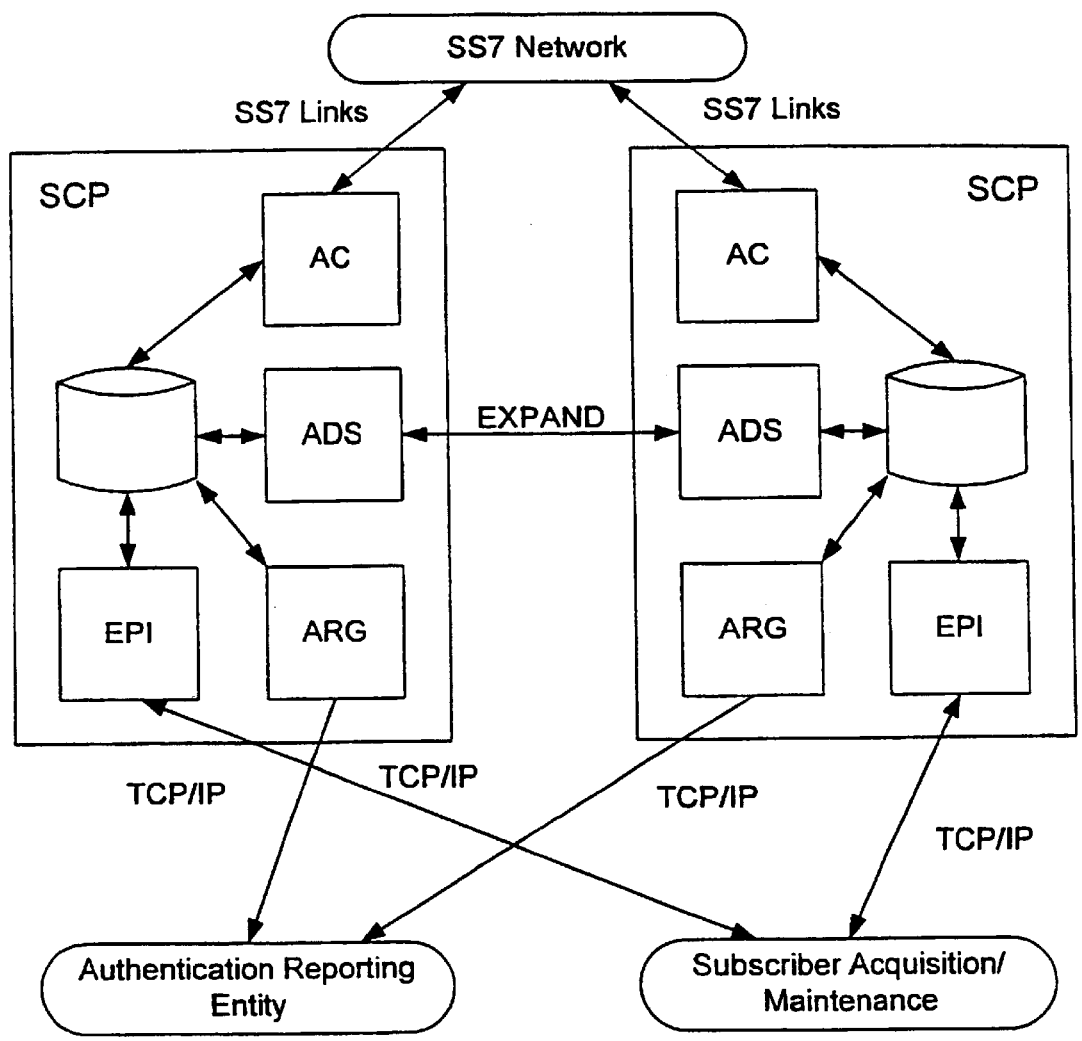
FIG. 15 shows another embodiment of the preferred invention incorporating mated SCPs.

FIG. 15 shows another embodiment of the preferred invention incorporating mated SCPs. In FIG. 15, each AC operates in a mated SCP environment with separate AC applications and databases on two physically separated SCP nodes. The mated SCP environment allows subscriber service processing to continue in the event that one of the SCP nodes is no longer accessible to the SS7 network. As a consequence, updates to one AC database must be applied to the associated AC database on the mated SCP node. Tandem's Application Database Synchronization (ADS) subsystem provides the database management services for the synchronization of the AC databases between the mated SCP nodes.

In summary, the present invention allows an Authentication Center (AC) in a cellular telephone system to order SSD update and unique challenge operations only if the receiving MSC/VLR is receptive to performing them. The AC has access to an MPCM file that indicates the circumstances under which each MSC/VLR in the system will perform SSD updates and unique challenges. Thus, whenever the AC determines that it is desirable to send either an SSD update or a unique challenge, the AC first checks the MPCM file to determine whether the message should be sent. If the database indicates that the MSC/VLR will not attempt the operation, the AC does not request the authentication operation.

While the invention has been described in conjunction with specific embodiments, it is evident that many alternatives, modifications and variations will be apparent to those skilled in the art in light of the foregoing description. Accordingly, it is intended to embrace all such alterative, modifications and variations as fall within the spirit and scope of the appended claims.

What is claimed is:

1. A method of sending an authentication message in a cellular communication system, the communication system including an Authentication Center (AC) having a processor for processing the steps of:

determining if an operation is needed for a subscriber unit, wherein the needed operation is from a group of operations comprising: a Shared Secret Data (SSD) update and a unique challenge;

accessing a database having configuration information for at least one Mobile Switching Center/Visitor Location Register (MSC/VLR) in the mobile telephone system, the configuration information for determining if the MSC/VLR can perform the operation for the subscriber unit; and sending an operation order to the MSC/VLR only if the subscriber unit needs the operation and the MSC/VLR can perform the operation.

2. The method of claim 1, wherein the step of accessing the database for the MSC/VLR includes:

determining from the configuration information if the MSC/VLR is associated with a base station that communicates with handsets via a voice channel during registration.

3. The method of claim 1, wherein the step of accessing the database for the MSC/VLR includes:

determining from the configuration information if the MSC/VLR is associated with a base station that communicates with subscriber units via a control channel.

4. A method of sending an authentication message in a cellular communication system, the communication system including an Authentication Center (AC) having a processor for processing the steps of:

determining if an operation is needed for a subscriber unit in response to a system access type, wherein the needed operation is from a group of operations comprising: a Shared Secret Data (SSD) update and a unique challenge;

accessing a database having configuration information for at least one Mobile Switching Center/Visitor Location Register (MSC/VLR) in the mobile telephone system, the configuration information for determining if the MSC/VLR can perform the operation for the subscriber unit; and sending an operation order to the MSC/VLR only if the subscriber unit needs the operation and the MSC/VLR can perform the operation for the system access type.

5. The method of claim 4, wherein the step of accessing the database for the MSC/VLR includes:

determining from the configuration information if the MSC/VLR is associated with a base station that communicates with handsets via a voice channel during registration.

6. The method of claim 4, wherein the step of accessing the database for the MSC/VLR includes:

determining from the configuration information if the MSC/VLR is associated with a base station that communicates with subscriber units via a control channel.

* * * * *